United States Patent
Um et al.

(10) Patent No.: US 10,365,375 B2
(45) Date of Patent: Jul. 30, 2019

(54) METHOD AND APPARATUS FOR IONOSPHERE DEPLETION DETECTION

(75) Inventors: Gregory Sechong Um, Torrance, CA (US); Yury N. Golubev, Anaheim, CA (US)

(73) Assignee: RAYTHEON COMPANY, Waltham, MA (US)

(*) Notice: Subject to any disclaimer, the term of this patent is extended or adjusted under 35 U.S.C. 154(b) by 2470 days.

(21) Appl. No.: 13/171,998

(22) Filed: Jun. 29, 2011

(65) Prior Publication Data
US 2013/0002482 A1    Jan. 3, 2013

(51) Int. Cl.
*G01S 19/07* (2010.01)
*G01S 19/14* (2010.01)
*G01S 19/40* (2010.01)
*G01S 19/43* (2010.01)

(52) U.S. Cl.
CPC .............. *G01S 19/07* (2013.01); *G01S 19/14* (2013.01); *G01S 19/40* (2013.01); *G01S 19/43* (2013.01)

(58) Field of Classification Search
CPC .......... G01S 19/07; G01S 19/14; G01S 19/40; G01S 19/43
USPC .......................... 342/357.44, 357.52, 357.23
See application file for complete search history.

(56) References Cited

U.S. PATENT DOCUMENTS

| | | | | |
|---|---|---|---|---|
| 6,407,700 B1 * | 6/2002 | Giffard | ................. | G01S 19/235 342/357.25 |
| 6,552,680 B1 * | 4/2003 | Barber | .................... | G01S 5/009 342/357.23 |
| 6,859,690 B2 * | 2/2005 | Asher et al. | ..................... | 701/13 |
| 7,031,730 B1 * | 4/2006 | Barber et al. | ................. | 455/457 |
| 7,629,923 B2 * | 12/2009 | Huang | ..................... | 342/357.43 |
| 7,840,351 B2 * | 11/2010 | Hwang | ................... | G01S 19/07 701/478.5 |
| 8,014,948 B2 * | 9/2011 | Vanderwerf | .................. | 701/469 |
| 8,305,266 B2 * | 11/2012 | Damidaux | ............. | G01S 19/07 342/357.44 |
| 8,344,946 B2 * | 1/2013 | Um et al. | ................. | 342/357.58 |
| 2006/0262010 A1 * | 11/2006 | Sato | ........................ | G01S 19/32 342/357.27 |
| 2009/0091493 A1 * | 4/2009 | Hwang et al. | ........... | 342/357.02 |
| 2011/0205116 A1 * | 8/2011 | Fujisawa et al. | ........ | 342/357.77 |
| 2013/0127659 A1 * | 5/2013 | Zhao et al. | ............... | 342/357.23 |
| 2013/0234886 A1 * | 9/2013 | Trilles et al. | ............ | 342/357.59 |
| 2014/0152497 A1 * | 6/2014 | Trilles | ..................... | G01S 19/13 342/357.51 |

OTHER PUBLICATIONS

Tracking F-region plasma depletion bands using GPS-TEC, incoherent scatter radar, and all-sky imaging at Arecibo Seker et al.; Communications & Space Sciences Laboratory (CCSL), Penn State University, PA, USA; Deparment of Electrical and Computer Engineering, University of Illinois at Urbana-Champaign, IL, USA; Online published Jul. 4, 2008.*

(Continued)

*Primary Examiner* — Chuong P Nguyen
(74) *Attorney, Agent, or Firm* — Lando & Anastasi, LLP

(57) ABSTRACT

A method of detecting a plasma depletion in the ionosphere includes comparing the large scale ionosphere trend with a local temporal slope of vertical or slant delay. In one example, the local temporal slope of delay is calculated phase data extracted from GPS signals at a GPS receiver, and the large scale trend is determined from broadcast ionosphere grid point delay data.

20 Claims, 9 Drawing Sheets

(56) References Cited

OTHER PUBLICATIONS

Effects of ionospheric small-scale structures on GNSS Wautelet, G. ; Lejeune, S. ; Warnant, R.; Ionospheric radio Systems and Techniques, 2009. (IRST 2009). The Institution of Engineering and Technology 11th International Conference on; Publication Year: 2009 , pp. 1-5.*
Ionospheric mapping function for total electron content (TEC) using global positioning system (GPS) data in Malaysia Ya'acob, N. ; Abdullah, M. ; Ismail, M. ; Bahari, S.A. ; Ismail, M.K. RF and Microwave Conference, 2008. RFM 2008. IEEE International; Publication Year: 2008 , pp. 386-390.*
Brown, Alison et al., "Benefits of a Space-Based Augmentation System for Early Implementation of GPS Modernization Signals", Proceedings of ION Annual Meeting, San Diego, Jun. 2000.
Cueto, M. et al., "Analysis of the Ionospheric Characteristics in the India Region for GNSS Applications", International Beacon Satellite Symposium 2010, Barcelona, Jun. 7-11, 2010.
Cueto, M. et al., "Ionospheric Deletion Detection over the Indian Region Using a Single Frequency Detection Algorithm", ION conference 2010.
Sarma, A.D., "Grid Ionospheric Vertical Error Analysis in the Context of WAAS", http://www.geospatialworld.net/index.php?option=com_content&view=article&id=14642%3Agrid-ionospheric-vertical-error-analysis-in-the-context-of-waas&catid=84%3Atechnology-gps&limitstart=1, Oct. 6, 2011.

* cited by examiner

METHOD AND APPARATUS FOR IONOSPHERE DEPLETION DETECTION

BACKGROUND

Radio frequency signals transmitted by satellites (for example, geosynchronous global navigation satellites) to receivers on the Earth's surface are delayed as they travel through the Earth's ionosphere. Accordingly, attempts are made to estimate and correct for these delays. Global positioning system (GPS) augmented systems provide users with ionosphere corrections for single-frequency measurements of the GPS signal. Space based augmentation systems (SBAS) support regional global navigation satellite systems (GNSS) augmentation through the transmission of additional satellite-broadcast messages. In these systems, a network of dual frequency GPS receivers at wide area reference stations estimate delays imparted by the ionosphere along the line of sight of each receiver. These estimated delays are relayed to and broadcast by the geosynchronous satellites. Interpolation of these measurements to a predefined set of grid nodes, referred to as ionospheric grid points (IGPs), at a designated height of 350 kilometers (km) above sea level provides a series of ionospheric delay estimates for the user. The ionospheric information is broadcast to single-frequency SBAS users based on the mutually agreed ionospheric model of grid vertical total delay values, called grid ionospheric vertical delays (GIVD). In addition, some SBAS systems also provide an indication of GIVD accuracy, known the grid ionospheric vertical error (GIVE). The intersection of the line of sight from receiver to satellite and the shell defined by the IGPs is known as the user's ionospheric pierce point (IPP). A user interpolates the grid node delay to the IPP to obtain an estimate of the ionospheric delay at the IPP. However, fluctuations in the characteristics of the ionosphere during the day and from day to day can cause significant errors in the delay estimations at the user IPPs.

Plasma depletions are strong reductions in the ionosphere F-region plasma density due to the appearance of a Rayleigh-Taylor instability, and produce significant reduction in the above mentioned ionospheric delay crossing the depletion zone. Plasma depletions are mostly aligned to the geomagnetic field and confined to the Appleton Anomaly region. As a result, equatorial regions are particularly affected by plasma depletions, with plasma density decreases of up to about three orders of magnitude (99.9%). However, plasma depletions are small-scale phenomena, generally seen in only one satellite-user line-of-sight. As a result, and due to the limited number of reference stations, depletions are not easily nor reliably sampled by SBAS systems which generally provide large-scale ionospheric information.

SUMMARY OF INVENTION

SBAS systems generally fail to handle ionosphere plasma depletion events well. Therefore, there is a need for both ground station GPS receivers and user receivers to implement depletion detection processes. Aspects and embodiments are directed to a method and apparatus for detecting plasma depletions at IPPs and removing depleted measurements from the ground IGP delay estimates. Embodiments of the method and apparatus leverage IGP trends, such as the IGP-predicted slope of the vertical or slant delay of GPS signals passing through the ionosphere, to detect depletions, as discussed in detail below. Simulations using data from real depletion shapes demonstrate that embodiments of the depletion detection process discussed herein have very high detection rates, approaching 100%, with approximately an order of magnitude reduction in the false alarm rate compared with prior methods.

According to one embodiment, a method of detecting a plasma depletion in the ionosphere comprises receiving at least one global positioning system (GPS) signal along a line of sight that passes through at least a portion of the ionosphere, receiving broadcast ionosphere grid point (IGP) data, extracting phase data from the at least one GPS signal to provide a phase input, and based on the phase input and the IGP data, determining whether the portion of the ionosphere through which line of sight passes is undergoing a plasma depletion.

In one example, the method further comprises determining a local temporal slope of delay at an ionosphere pierce point (IPP) along the line of sight based on temporal differencing of the phase input. Determining whether the portion of the ionosphere is undergoing a plasma depletion may include calculating a second temporal derivative of the local temporal slope of delay at the IPP, and declaring a depletion responsive to the second temporal derivative exceeding a predetermined threshold value. In another example, the method further comprises determining an IGP-predicted temporal slope of delay at the IPP from the IGP data. Determining whether the portion of the ionosphere is undergoing a depletion may include comparing the IGP-predicted temporal slope of delay and the local temporal slope of delay, and declaring a depletion responsive to a difference between the IGP-predicted temporal slope of delay and the local temporal slope of delay exceeding a predetermined threshold value. Determining the IGP-predicted temporal slope of delay at the IPP may include performing a spatial extrapolation on the broadcast IGP data, performing a spline extrapolation on the spatially extrapolated broadcast IGP data, determining a grid rate of change of total electron content, and interpolating the grid rate of change of total electron content to provide the grid-predicted temporal slope of delay at the IPP. In another example, the method further comprises initiating a depletion duration timer responsive to declaring the depletion. In another example, the method further comprises, after declaring the depletion, declaring a depletion exit responsive to the depletion duration timer exceeding a predetermined time limit. The method may further comprise, after declaring the depletion, performing a depletion exit test and declaring a depletion exit responsive to at least one exit criterion of the depletion exit test being met.

According to another embodiment, a method of detecting plasma depletions in the ionosphere at an ionosphere pierce point (IPP) comprises receiving broadcast ionosphere grid point (IGP) data, receiving at least one signal along a line of sight that passes through the IPP, calculating an IGP-predicted temporal slope of delay at the IPP from the IGP data, calculating a local temporal slope of delay at the IPP based at least in part on phase data extracted from the at least one signal, comparing the IGP-predicted temporal slope of delay and the local temporal slope of delay, and declaring a depletion based at least in part on a difference between the IGP-predicted temporal slope of delay and the local temporal slope of delay exceeding a predetermined threshold.

In one example of the method, receiving the at least one signal includes receiving a first signal having a first carrier phase and a second signal having a second carrier phase, wherein calculating the local temporal slope of delay includes determining a difference between the first carrier phase and the second carrier phase to provide a phase input, and calculating the slope based on temporal differencing of the phase input. Determining the IGP-predicted temporal slope of delay at the IPP may include performing a spatial extrapolation on the broadcast IGP data, performing a spline extrapolation on the spatially extrapolated broadcast IGP data, determining a grid rate of change of total electron content, and interpolating the grid rate of change of total electron content to provide the grid-predicted temporal slope of delay at the IPP. In one example, declaring a depletion further includes calculating a second temporal derivative of the local temporal slope of delay at the IPP, and declaring a depletion responsive to the second temporal derivative exceeding a predetermined threshold value. In one example, the method further comprises initiating a depletion duration timer responsive to declaring the depletion. The method may further comprise, after declaring the depletion, performing a depletion exit test and declaring a depletion exit responsive to at least one exit criterion of the depletion exit test being met. In one example, performing the depletion exit test includes determining whether the depletion duration timer exceeds a predetermined time limit. In another example, performing the depletion exit test includes calculating an updated IGP-predicted temporal slope of delay at the IPP, calculating an updated local temporal slope of delay at the IPP, comparing the updated IGP-predicted temporal slope of delay with the updated local temporal slope of delay, and declaring a depletion exit responsive to a difference between the updated IGP-predicted temporal slope of delay and the updated local temporal slope of delay being less than a predetermined threshold. In another example, calculating the IGP-predicted temporal slope of delay includes calculating one of a IGP-predicted temporal slope of vertical delay and a IGP-predicted temporal slope of slant delay, and calculating the local temporal slope of delay includes calculating a corresponding one of a local temporal slope of vertical delay and a local temporal slope of slant delay.

Another embodiment is directed to a global positioning system (GPS) receiver comprising an antenna configured to receive a first GPS signal, an initialization module coupled to the antenna and configured to receive the first GPS signal and broadcast ionosphere grid point (IGP) data, and to determine a grid-predicted temporal slope of delay at a designated ionosphere pierce point (IPP) based on the IGP data and a local temporal slope of delay at the designated IPP based on phase data extracted from the first GPS signal, and a detection module configured to detect a plasma depletion in the ionosphere at the designated IPP based on a comparison of the grid-predicted temporal slope of delay and the local temporal slope of delay.

In one example of the GPS receiver, the antenna is further configured to receive a second GPS signal, the first GPS signal having a first carrier phase and the second GPS signal having a second carrier phase, wherein the initialization module is configured to determine the local temporal slope of delay based on a change over time in a difference between the first carrier phase and the second carrier phase.

Still other aspects, embodiments, and advantages of these exemplary aspects and embodiments, are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

DETAILED DESCRIPTION

Figure 1:
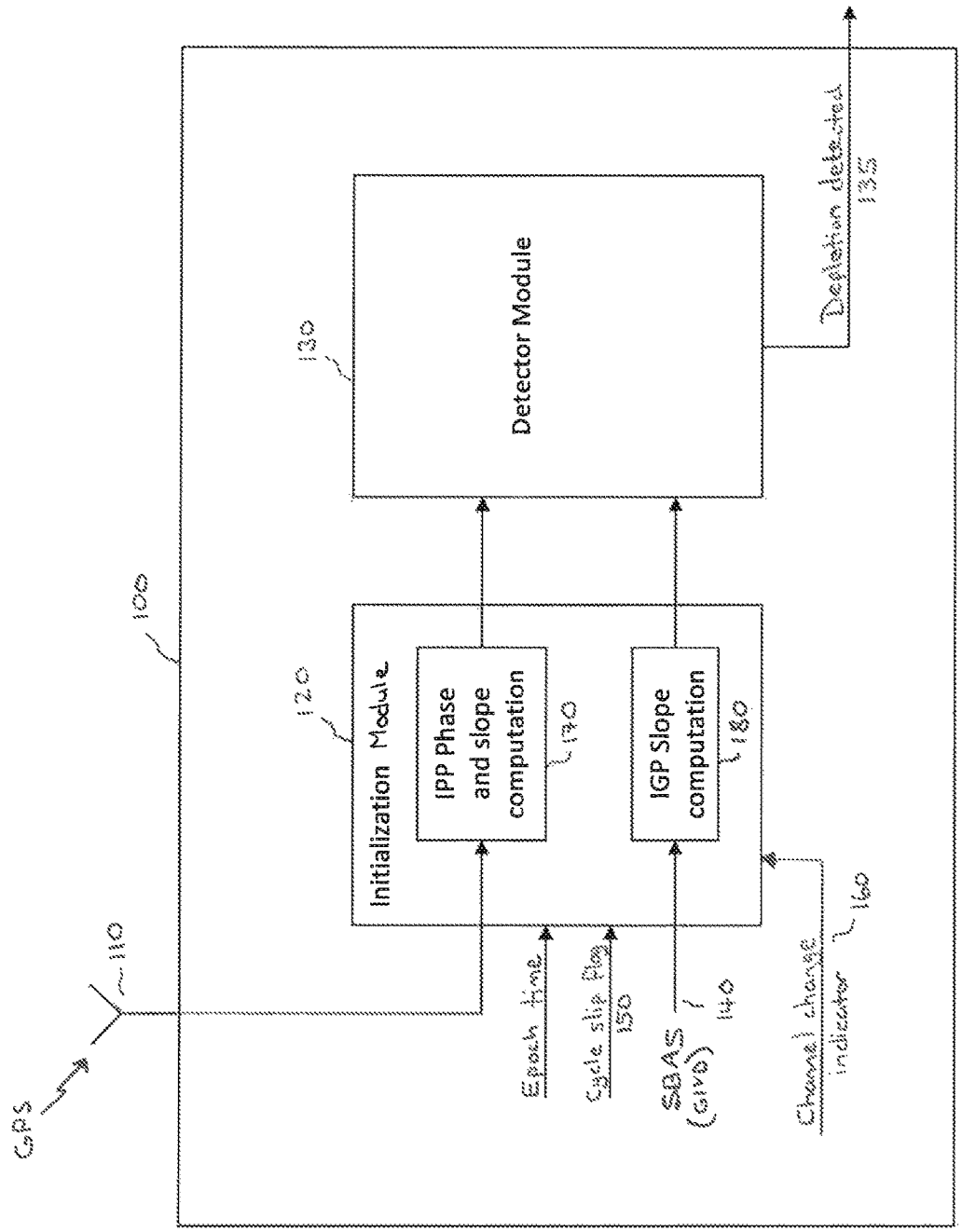
FIG. 1 is a block diagram of one example of a GPS receiver according to aspects of the invention.

Plasma depletions are small-scale (local) phenomena of the ionosphere and as a result, receivers on the ground in different locations "see" different depletion events. Depletions are not modeled or accounted for in large-scale ionosphere information. However, many navigation and positioning systems rely on ground-based receiver data to estimate GPS satellite signal delay and the presence of depletions can cause significant large-scale delay errors. Therefore, there is a need for a method of accurately and reliably detecting plasma depletions in the ionosphere and removing them before the large-scale delay estimation.

A number of processes for detecting and compensating for plasma depletions have been proposed; however, several of these suffer from high rates of false alarms and mis-detections, and are therefore unreliable. For example, one method of detecting plasma depletions includes detecting delay "jumps" by comparing measurements at the user ionospheric pierce point (IPP) with the ionospheric grid point (IGP)

delay estimate from the space-based augmentation system (SBAS) message. This method analyzes a single frequency user measurement, referred to as pseudo range minus carrier phase (for each epoch and selected satellite line of sight), which is generally equal to twice the ionosphere delay plus an unknown phase ambiguity, as given by Equation (1):

$$\rho - \varphi = 2 \cdot I + \varphi_{AMB} + \varepsilon \quad (1)$$

In Equation (1), $\rho$ is the pseudo range measurement (in meters), his the carrier phase measurement (in meters), $\varphi_{AMB}$ is the phase ambiguity (converted to meters), I is the slant ionosphere delay (converted to meters), and $\varepsilon$ is random noise. The phase ambiguity $\varphi_{AMB}$ is estimated from the IGP data and periodically updated by the reference stations. GPS signals include a ranging code, generally a pseudorandom binary sequence. This example process of depletion detection includes computing an averaged and smoothed slope of a quantity referred to as the corrected pseudo code minus carrier phase (CCMC), which removes the large-scale ionospheric contributions provided by the SBAS message to attempt to provide insight into the small-scale ionospheric variations, such as depletions:

$$CCMC = \rho - \varphi - 2 \cdot I_{SBAS} = I_{small-scale} + \varphi_{AMB} + \varepsilon \quad (2)$$

The average of $\rho - \varphi - 2I_{SBAS} - \varphi_{AMB}$ in the absence of a depletion is a bias estimate between single frequency measurements at the user IPP and the grid (IGP) prediction at that IPP. Thus, this method essentially looks for a sudden change (or "jump") in this bias estimate, i.e., a deviation between the measurement and the grid prediction after bias correction. For example, for each epoch, a new incoming CCMC is compared with the prior epoch average, and if the difference exceeds a specified amount (for example, 1.5 meters), a depletion is declared. Thus, this method uses the IGPs (which are representations of large-scale ionosphere characteristics because they are estimated from global distributions of IPPs) as a reference and views IPP measurements deviating substantially from the IGP predictions as depletions, i.e., small-scale ionosphere phenomena. However, this method suffers from an inherent problem in that correcting the bias error with the IPP measurement itself introduces complications and/or errors because the bias estimate can be corrupted by depletions. Furthermore, the pseudo ranges are noisy (and therefore inaccurate) due to multipath effects. In addition, in challenging ionosphere regions, such as the equatorial region where the ionosphere has significant variations, the IGP prediction is not accurate in terms of absolute delay, meaning that the desired term of $I_{small-scale}$ in Equation (2) is not actually small scale and contains large errors. As a result, this method may cause many false alarms and/or mis-detections due to the unreliability of the reference data.

Aspects and embodiments are directed to a method and apparatus which uses the observation that the ionosphere trend is fairly well followed by the grid prediction, even when the ionosphere is volatile, as the basis for detecting ionosphere plasma depletions. In one embodiment, the temporal slope of the IGP estimated signal delay caused by travel of the signal through the ionosphere is used as a reference to determine whether an IPP is undergoing a depletion. The IGPs are relatively devoid of depletion corruption because the depletion events are rare and each IGP is estimated uses a fairly large plurality (e.g., more than 30) of measurements. As a result, the time slope of the IGPs (also referred to herein as the IGP time trend) is relatively accurate and reliable as a reference for depletion detection, as discussed further below. In one embodiment, the temporal slope of the IGP estimated delay (interpolated from IGPs nearby to the IPP) is compared with the local line-of-sight (IPP) temporal slope of delay, and if the IPP trend is lower than IGP trend by a threshold amount, a depletion is declared. As discussed further below, the slope computation allows the use of phase measurements which have relatively little associated noise instead of pseudo ranges which are noisy, which may allow for more accurate determination of depletions. This may provide a significant advantage over conventional methods that use pseudo ranges. In addition, comparison of the temporal slopes (i.e., the changes in the delay values over time), rather than the delay values themselves, obviates the need to remove the bias differences, thereby avoiding the potential bias estimate contamination discussed above.

Some attempts to detect depletions by comparing the IGP-predicted delay slope trend with the local temporal slope of measured delay have provided lower false alarm rates than the jump-detection method discussed above; however, depletion exits may be declared too soon due to oscillations within the depletion. For example, in one method a depletion exit is declared as soon as the delay slope is reversed, resulting in multiple entries and exits being made within one actual depletion event due to oscillations within the depletion. As result, epoch-by-epoch counting of the depletion detection probability remains low. Accordingly, aspects and embodiments a directed to a depletion detection method that, in combination with delay slope comparisons, specifies additional entry (start of the depletion) and exit (end of the depletion) criteria which may increase the reliability of the detection method, as also discussed further below.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 2:
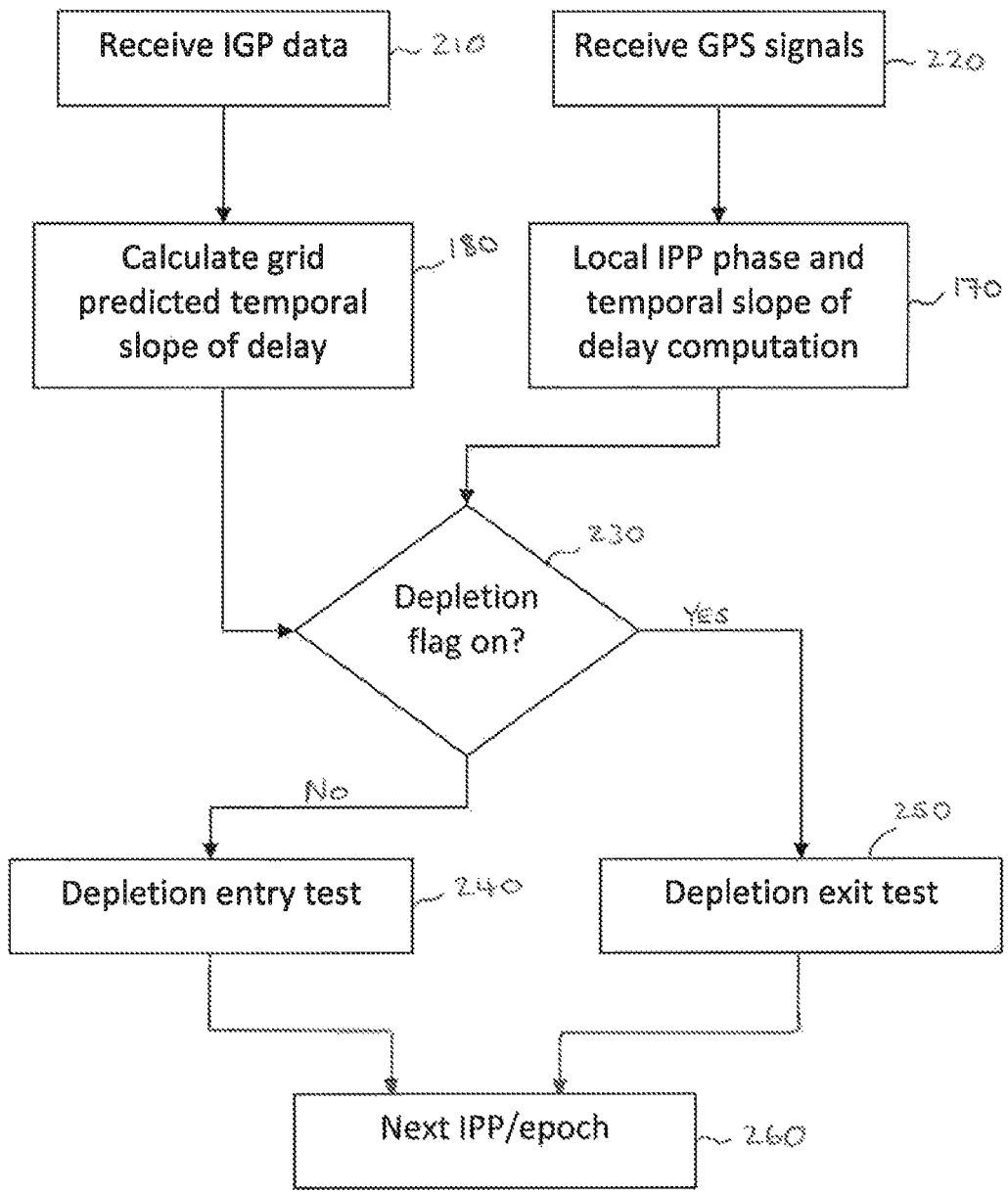
FIG. 2 is a flow diagram of one example of a depletion detection method implemented by the GPS receiver of FIG. 1, according to aspects of the invention.

Referring to FIG. 1 there is illustrated a simplified functional block diagram of one example of a receiver configured to implement a plasma depletion detection method. In one example, the receiver 100 is a dual frequency GPS receiver which includes an antenna 110 for receiving the GPS signals. All current GPS satellites broadcast at the same two frequencies, 1.57542 GHz (the L1 signal) and 1.2276 GHz (the L2 signal). Accordingly, the following discussion may refer to the L1 and L2 signals; however, it is to be appreciated that the method may be applied using signals at numerous different frequencies and is not limited to the use of the L1 and L2 signals. The receiver includes an initialization module 120 configured to set up the data used to implement a depletion detection process, and a detection module 130 that performs embodiments of the depletion detection process, as discussed further below. FIG. 2 illustrates a flow diagram of one example of a depletion detection method implemented by the GPS receiver 100.

According to a variety of examples, the initialization module 120 and detection module 130 are implemented as one or more hardware and/or software components. In some examples, the initialization module 120 and detection module 130 are implemented as computer-executable programs running on one or more commercially available processors, such as processors manufactured by Texas Instruments, Intel, AMD, Sun, IBM, Motorola, Freescale and ARM Holdings. However, the initialization module 120 and detection module 130 may be implemented on any type of processor, field-programmable gate array, multiprocessor or controller, whether commercially available or specially manufactured, that is programmed to perform the signal processing and computations discussed below. In some examples, GPS receiver 100 may include computer-readable, non-transitory storage (not shown in FIG. 1) to store data, as discussed below. This storage may include, for example, a relatively high performance, volatile, random access memory such as dynamic random access memory (DRAM), static memory (SRAM) or synchronous DRAM. However, the storage may include any device for storing data, such as a non-volatile memory, with sufficient throughput and storage capacity to support the functions described herein.

As discussed above, according to one embodiment, a method of detecting a depletion includes comparing the temporal slope of the IGP-estimated (or "grid-predicted") slope of vertical (or slant) delay (the large scale ionosphere trend) with the local IPP temporal slope of vertical (or slant) delay. The depletion may be characterized by a sharp drop in the delay at the IPP relative to the slope of the IGP prediction at the IPP. The local IPP temporal slope of delay is calculated from the difference between the carrier phases of the L1 signal and the L2 signal, and the grid-predicted slope is determined from the IGP data. Accordingly, the inputs to the depletion detection process include the L1 and L2 phase data at each IPP (obtained from the GPS signals received via antenna 110; step 220), and current broadcast grid vertical delay (GIVD) data (step 210), which may be contained in a received SBAS message 140 as discussed above. In one example, the SBAS message containing the IGP data is received using antenna 110, or another antenna (not shown). Alternatively, the IGP data may be obtained via a wired connection or other transmission medium. Further inputs to the process include a phase slip indicator 150 and change channel indicator 160 for each IPP, as discussed further below.

According to one embodiment, the receiver 100 performs the IPP slope computation 170 (which may include extracting phase data from the L1 and L2 signals) and the IGP slope computation 180. Each of these processes is discussed further below. In one embodiment, the computations are periodically repeated as the IGP data is updated and the GPS signals are received. Accordingly, the system may be configured to check whether a prior iteration of the depletion detection process resulting in a depletion being declared, to determine whether a depletion entry (start of depletion) or exit (end of depletion) test should be performed using the presently-calculated delay slopes. In one embodiment, the depletion detection method is implemented on a computer or microprocessor (such as a digital signal processor as discussed above) in the GPS receiver as one or more hardware and/or software components. When the detector module 130 declares a depletion, the detector module may output an indicator 135 indicating that a depletion has been detected. In one example, this indicator includes a "flag" that may be set in the software. Accordingly, the system may check whether the depletion indicator flag is on or off (step 230) to determine whether to perform a depletion entry test (step 240) or exit test (step 250). Examples of each of these tests are discussed further below. Although the following discussion may refer to the depletion "flag" it is to be appreciated that the system is not limited to the use of software flag to determine whether to perform an entry test or exit test, and various types of indicators may be used, as would be appreciated by those skilled in the art, given the benefit of this disclosure. The process may be repeated at each next IPP/epoch (step 260).

Figure 3:
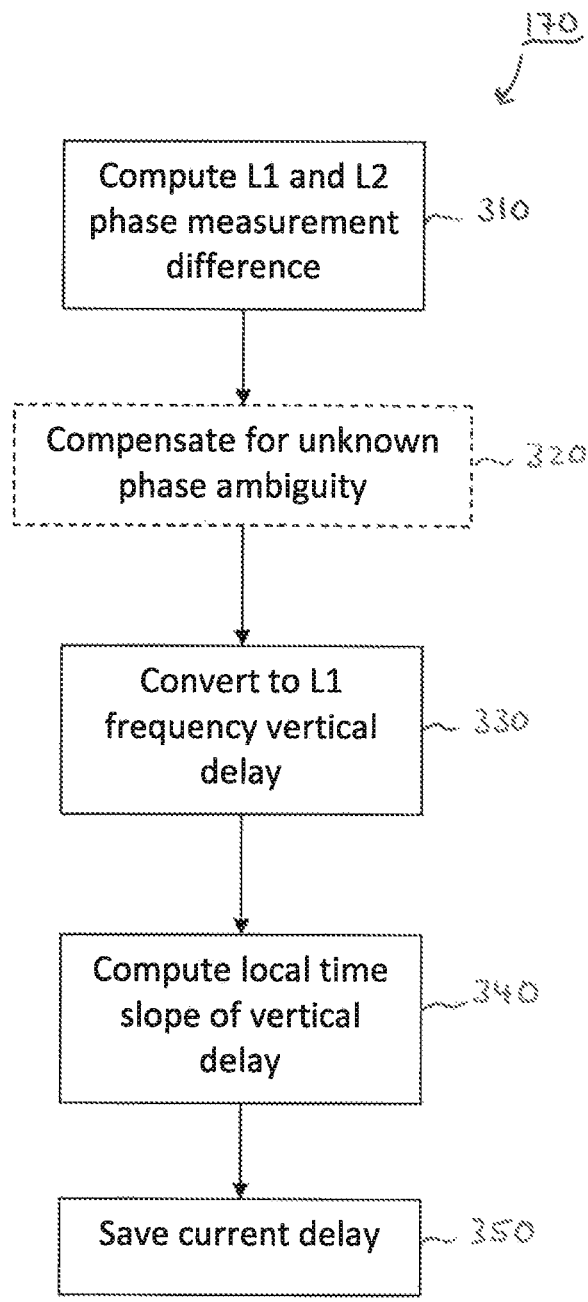
FIG. 3 is a flow diagram illustrating one example of an IPP slope computation process according to aspects of the invention.

Referring to FIG. 3, there is illustrated one example of a process of computing the local temporal slope of delay at a given IPP, represented in FIG. 1 by IPP phase and slope computation 170. In one embodiment, the phase data input is the difference between the carrier phases of the L1 signal and the L2 signal. Accordingly, this difference is computed in step 310. As discussed above, these quantities have very little associated noise, and therefore computations based on these quantities may be more reliable than computations based on noisy pseudo ranges. There is a large embedded number in this data due to the unknown phase ambiguity. Accordingly, in one example, an arbitrary constant is subtracted from the phase difference for each IPP to make the numbers more manageable (step 320). Since the following process computes temporal differences, this constant drops out and does not affect the final result. Since the IGP data presently are computed for the L1 delay, the L2/L1 phase difference is normalized, for a process implemented at a ground-based reference station, as follows (step 330) before being provided to the detector module 130:

$$\text{input} = (\phi_2 - \phi_1)\frac{f_2^2}{(f_1^2 - f_2^2)} = 1.55(\phi_2 - \phi_1) \qquad (3)$$

In Equation (3), $\varphi_1$ is the phase of the L1 signal and $\varphi_2$ is the phase of the L2 signal. In one example, to apply this method to a depletion detector at a user who has access to only the L1 frequency measurement, the input is modified to be $0.5(\rho-\varphi)$. Again, there is a large unknown phase ambiguity imbedded in this input, so an arbitrary large constant number for each IPP can be subtracted (step 320) if that is convenient for processing.

Still referring to FIG. 3, step 340 includes determining local IPP temporal slope of delay, which is then saved (step 350) in associated computer storage/memory (not shown in FIG. 1) for further computations, as discussed below. In one example, the slope is computed from the following equation:

$$\text{IPP\_slope} = \frac{[\text{input}(t) - \text{input}(t - dt)]}{dt} \qquad (4)$$

In Equation (4), the input is the expression from Equation (3), t is an epoch time, and dt is the epoch time increment.

Figure 4:
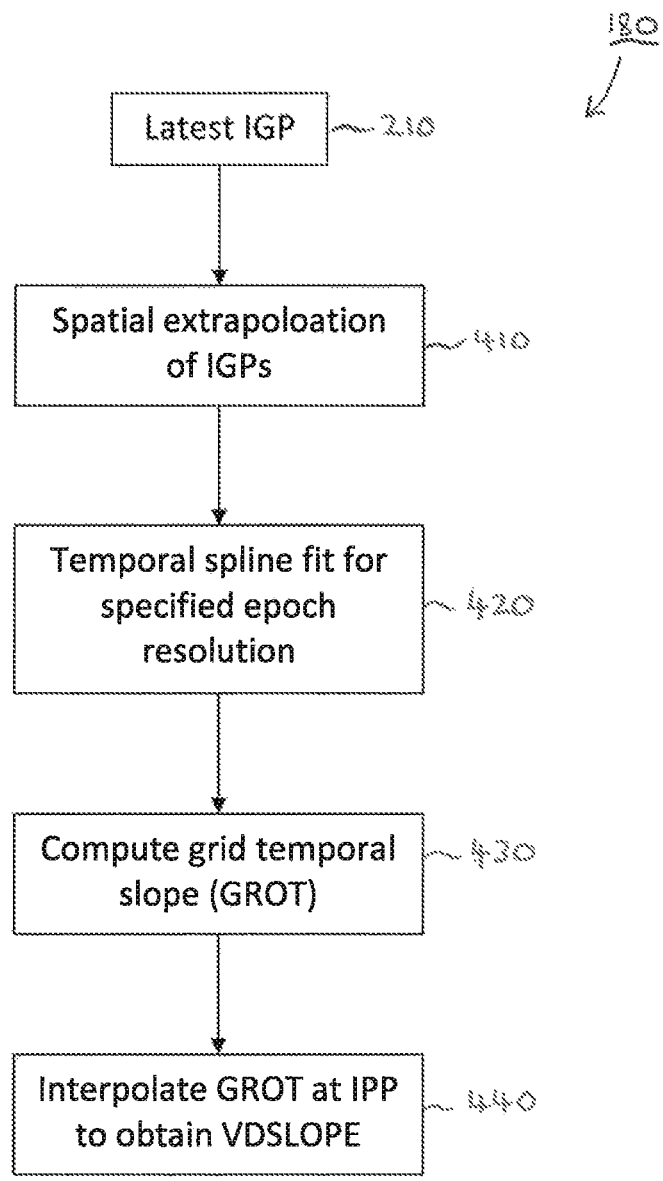
FIG. 4 is a flow diagram illustrating one example of an IGP slope computation process according to aspects of the invention.

According to one embodiment, since the IGP information is used as a reference, the IGP data is processed to improve its content. Referring to FIG. 4, there is illustrated a flow diagram illustrating one example of an IGP slope computation process 180 according to one embodiment. The initialization module receives the IGP data (step 210). As discussed above, the ionosphere is represented by a plurality of IGPs; however, in some instances, not all IGPs in a given region may be monitored sufficiently regularly. Accordingly, in one embodiment, a spatial extrapolation is performed on the latest broadcast IGP's to fill in any "holes" (step 410). After the extrapolation processing, all grid points may be considered usable and valid. The broadcast IGP data is received periodically, for example, every 5 minutes. Accordingly, in one example, after the spatial extrapolation of step 410, a spline extrapolation (step 420) is performed to fill the time gaps between each IGP update. In step 430 the grid temporal slope, also referred to as the grid rate of change of total electron content (GROT) is computed. The GROT is computed in a similar manner to the IPP slope given in Equation (4) above by taking the time difference of the IGP interpolated delay at the IPP. In one example, spline extrapolation and the "warm-up" period for the GROT are approximately 300-600 seconds. Accordingly, approximately two or three broadcast IGP data may be used for the computations. The system maintains the GROT from which the large scale ionosphere trend (including the grid-predicted slope of delay) may be computed at any time and any IPP by interpolation. In one embodiment, interpolation of the GROT is performed at step 440 to estimate the grid-predicted vertical delay slope at a given IPP, referred to as "VDSLOPE."

As discussed above, embodiments of the depletion detection method include determining the local IPP temporal slope of delay, which uses the phases of the L1 and L2 signals. A phase slip, also referred to as a cycle slip, is a discontinuity of an integer number of cycles in the measured (integrated) carrier phase resulting from a temporary loss-of-lock in the carrier tracking loop of the GPS receiver. This corrupts the carrier phase measurement, causing the unknown phase ambiguity value to be different after the cycle slip compared with its value before the slip. If a cycle slip occurs, at least one epoch delay may be required to compute the IPP slope during which time the detection process is suspended. In one example, the system is configured to wait two epochs (for the valid computation of the IPP slope) after a cycle slip before the resumption of the depletion detection process. Accordingly, as discussed above, an input to the initialization module 120 is the cycle slip flag 150, which indicates when a cycle slip occurs. Another input is the channel change indicator/flag 160 which indicates when the GPS receiver changes a communication channel over which the GPS signals are received. A channel change may similarly cause the system to re-initialize the IPP slope computation, as discussed above for the occurrence of a cycle slip. Accordingly, the system may wait at least one epoch after a channel change is indicated (for the valid computation of the IPP slope) before resuming the depletion detection process.

Figure 5:
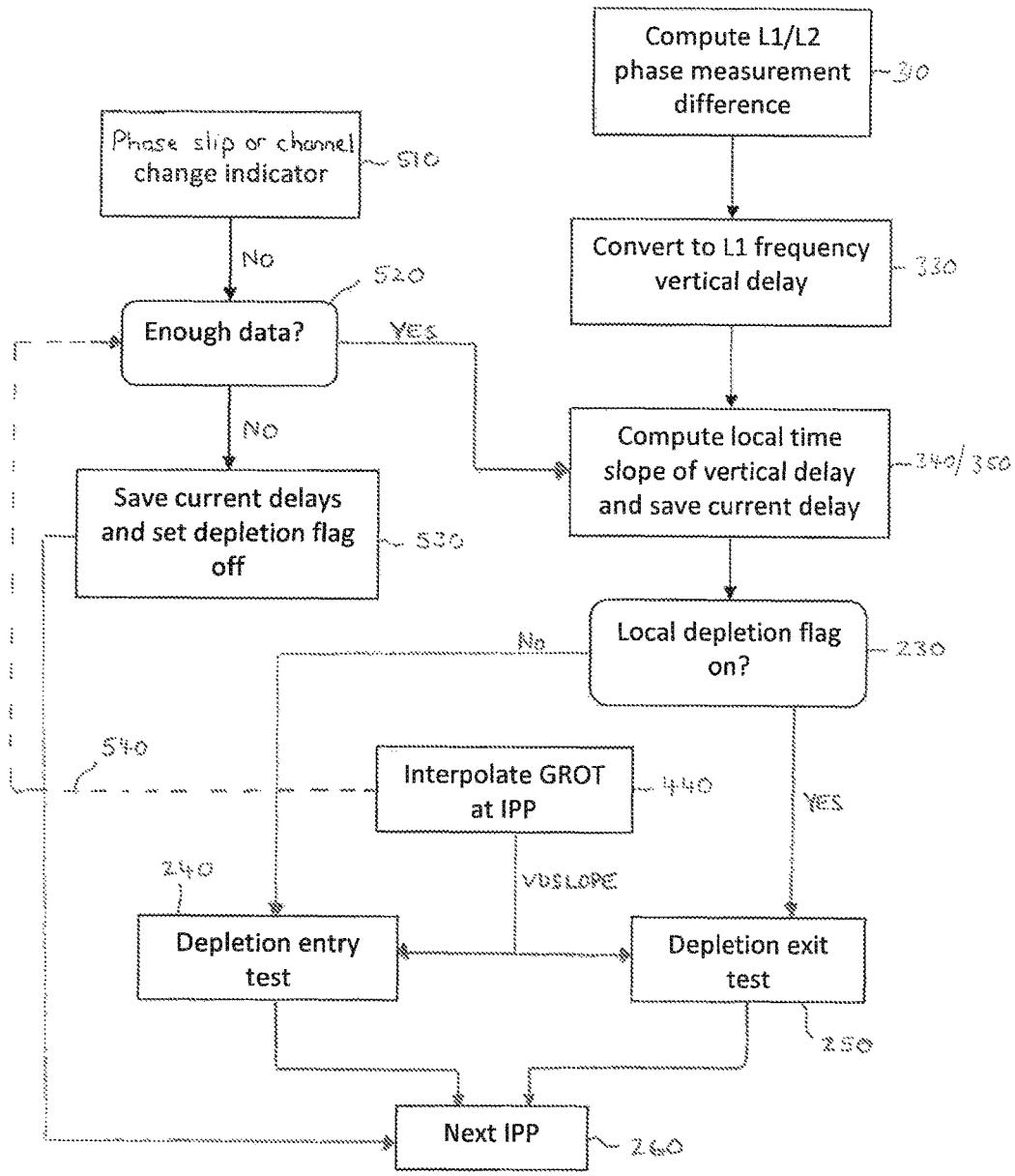
FIG. 5 is a flow diagram illustrating one example of a method of detecting plasma depletions according to aspects of the invention.

FIG. 5 illustrates a flow diagram of one example of the depletion detection method. In one example, the system is configured to review the cycle slip flag 150 and channel change flag 160 inputs. As discussed above, if the phase slip indicator and/or channel change indicators are on, the system may wait at least one epoch before beginning the next iteration of the depletion detection process and clearing the indicator(s), for example, setting the flag(s) off. If the phase slip and channel change indicators are off, for example, after having been cleared as discussed above, the system may be configured to determine whether sufficient data has been obtained for valid computation of the IPP slope of delay (step 520). If there is insufficient data, the system may be configured to save the current delay information and set the depletion flag off, since a valid determination of the presence of a depletion cannot be made with insufficient data (step 530), and wait for the next IPP/epoch (step 260). Similarly, if there is insufficient data to perform the IGP slope computation at the IPP, the system may proceed to step 530, as represented in FIG. 5 by dotted line 540.

According to one embodiment, determination of whether a depletion should be declared, i.e., a depletion entry test 240, includes determining whether the local delay slope at the IPP (calculated at step 340) meets certain conditions, for example, relative to the grip-predicted delay slope and/or relative to the prior-calculated local delay slope. As discussed above, in one embodiment, one of conditions used to declare a depletion is the local IPP slope being lower than the IGP-predicted slope by a threshold amount. This threshold amount is a predetermined value of the local total electron content (TEC). This depletion entry criterion is specified in Equation (6) below. In another embodiment, the change in the local IPP temporal slope from one epoch/IPP to the next (the second temporal derivative) may be used as an additional depletion entry criterion, as specified below in Equation (7). By using either the variation between the grid-predicted delay slope and the actual determined slope of delay at the IPP or the second temporal derivative of the local IPP temporal slope of delay, embodiments of this method may provide more robust depletion detection, particularly in volatile ionosphere conditions.

Figure 6:
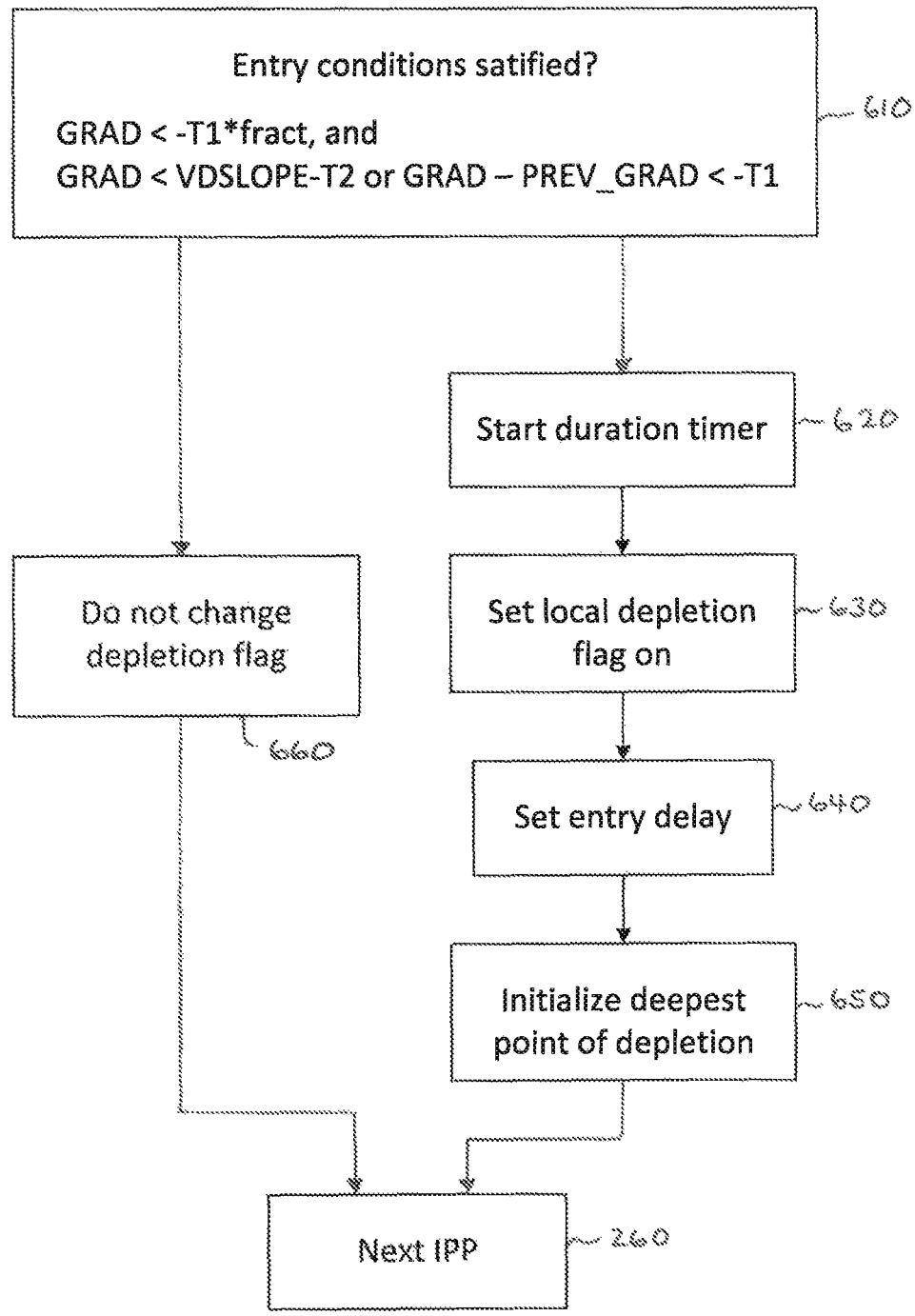
FIG. 6 is a flow diagram illustrating one example of a method of declaring a depletion according to aspects of the invention.

Referring to FIG. 6 there is illustrated a flow diagram of one example of a method of declaring a depletion at an IPP. As discussed above, in one example a threshold condition for performing the depletion entry test 240 is that the local depletion flag is off (i.e., the ionosphere at the IPP is not currently in a depletion phase), as illustrated in FIGS. 2 and 5. In one embodiment, a depletion entry is determined (step 610) from simultaneously satisfying the condition specified in Equation (5) below and either the condition set forth in Equation (6) or the condition set forth in Equation (7).

$$\text{GRAD} <= -T1 * \text{fract} \quad (5)$$

$$\text{GRAD} < \text{VDSLOPE} - T2 \quad (6)$$

$$\text{GRAD} - \text{PREV\_GRAD} < -T1 \quad (7)$$

In Equations (5)-(7), GRAD is the current local IPP delay slope, PREV_GRAD is the prior local IPP delay slope, and T1, T2 and fract are threshold settings for the local TEC. As discussed above, VDSLOPE is the grid-predicted vertical delay slope at the local IPP determined from the interpolation of GROT at the IPP (step 440). T2 is the threshold amount by which the local IPP vertical delay slope differs from the grid-predicted slope to result in a depletion being declared. T1 is the threshold amount for the change in the local IPP temporal slope from one epoch/IPP to the next (the second temporal derivative) to result in a depletion being declared. Equation (5) specifies a test (entry criterion) for the absolute local IPP temporal slope of delay, independent of the grid-predicted slope. In Equation (5), T1 is a threshold value for the absolute local IPP temporal slope of delay, and fract is an adjustment constant.

According to one embodiment, when the above conditions (Equation (5) and either Equation (6) or Equation (7)) are satisfied and a depletion is entered, the system is configured to take the following actions. A depletion duration timer is started (step 620) and the local depletion flag is set on (step 630). The depletion duration timer is used in examples of the depletion exit test as discussed further below. In step 640 the current value of the ionosphere delay at the IPP is initiated and saved (for example in associated computer storage/memory). In one example, while in depletion, the deepest depth of the depletion (i.e., smallest vertical or slant delay) and the current height from the deepest point are estimated (step 650) until the exit criteria are met. It is to be appreciated that steps 620-650 may be performed in any order or simultaneously and do not necessarily need to be performed in the order illustrated in FIG. 6. If the depletion entry criteria of step 610 are not met, the depletion flag is not changed (660), and the system waits for the next IPP/epoch (step 260) to repeat the depletion entry test.

Figure 7:
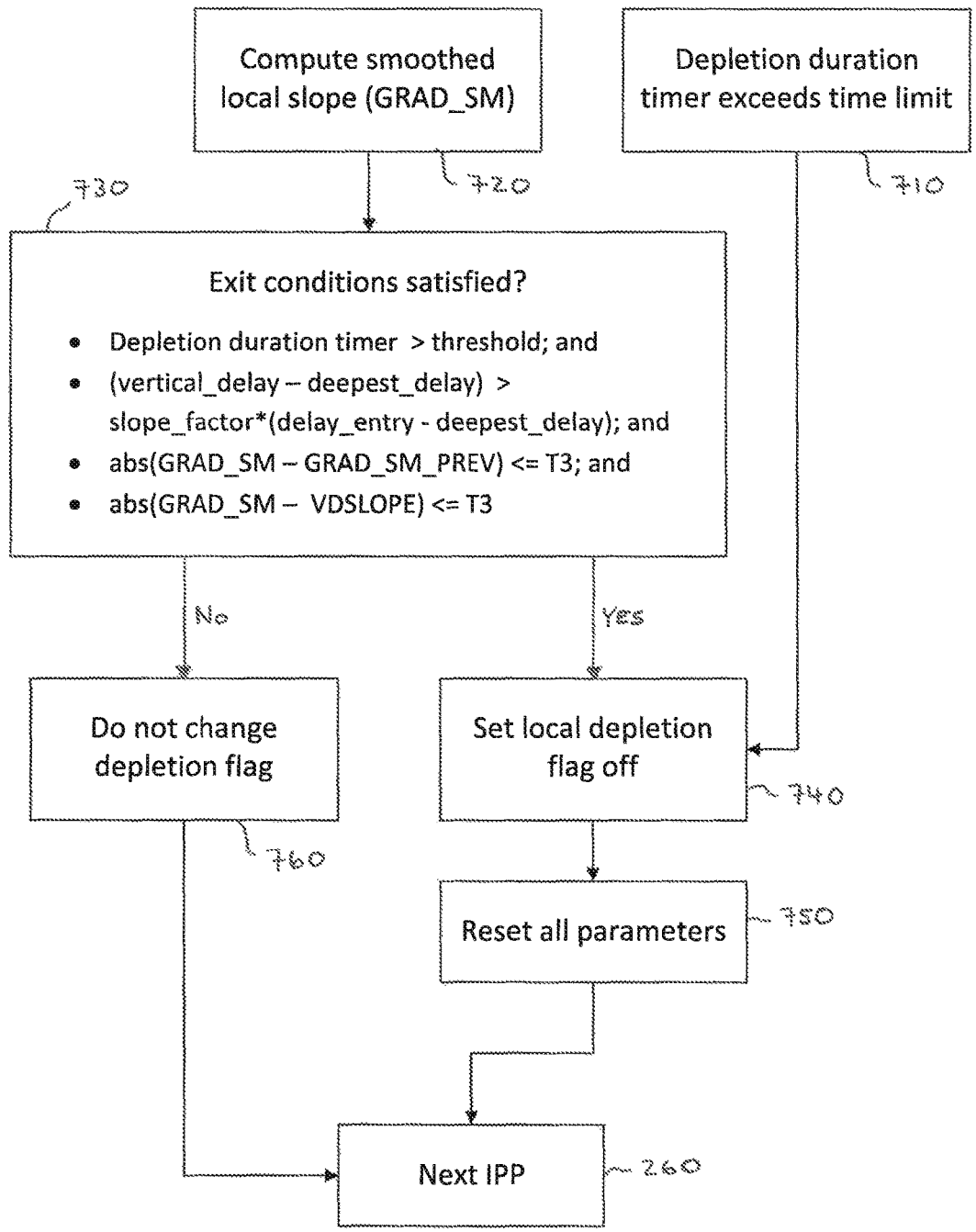
FIG. 7 is a flow diagram illustrating one example of a method of determining a depletion exit according to aspects of the invention.

Referring to FIG. 7 there is illustrated a flow diagram of one example of a method of declaring an exit from a prior-detected depletion at an IPP. As discussed above, in one example a threshold condition for performing the depletion exit test 250 is that the local depletion flag is on (i.e., the ionosphere at the IPP is currently in a depletion phase, as detected by the receiver 100), as illustrated in FIGS. 2 and 5. As discussed above, in one example, after a depletion entry has been declared, a depletion duration timer is started (step 620). According to one embodiment, a depletion exit may be declared after the depletion duration timer exceeds a preset time limit, for example, 45 minutes (step 710). This time limit may be chosen based on, for example, historical and/or statistical information regarding the average duration of ionosphere depletion events in the region. Alternatively, a depletion exit may be declared based on the IPP and grid-predicted slope differences, as well as the value of the measured delay at the IPP returning to within a specified factor of the delay value set at the entry point of the depletion (in step 640). The factor may vary depending on whether the grid-predicted slope is upward or downward in time.

According to one embodiment, the depletion exit test uses a smoothed version of the local IPP temporal slope of delay. In one example, the smoothing is done by linear fitting of the measured data over a specified time period, for example, the latest 45 seconds. The time period may be selected, for example, based on testing with data from a given region where the GPS receiver is to be used. Accordingly, the depletion exit determination process may include a step 720 of computing the smoothed local slope (GRAD_SM). In one embodiment, the exit criteria may include the following, as illustrated in step 730. The depletion duration timer may exceed a certain predetermined threshold, for example, 1 minute. The depletion itself (i.e., the shape of the depletion) is often noisy, which can cause the system to declare an exit too early. Accordingly, requiring the depletion duration timer to reach a threshold value (i.e., the depletion must continue for a minimum time period) may reduce the probability of declaring an exit too soon as a result of oscillations within the depletion. As discussed above, some prior methods of depletion detection suffer from errors as a result of declaring depletion exits too soon.

As discussed above, another exit criterion may be a determination of whether the delay measured at the IPP has "recovered" to within a certain amount of the measured delay at the time at which the depletion was declared. The exit test may also include determining the "distance" of the delay value from the deepest point of the depletion estimated in step 650. These conditions are specified in Equation (8) below:

$$(\text{vertical\_delay} - \text{deepest\_delay}) > \text{slope\_factor} * (\text{delay\_entry} - \text{deepest\_delay}) \quad (8)$$

In Equation (8) "vertical_delay" is the current measured vertical delay at the IPP, "deepest_delay" is the deepest point estimated in step 650, and "delay_entry" is the value of the vertical delay at the IPP at the time the depletion was declared (saved in step 640). Equation (8) may be modified to use slant delay values rather than vertical delay values, as would be recognized by one skilled in the art given the benefit of this disclosure. The "slope_factor" is a variable which may be selected based on testing with data from a given region. The slope_factor is used to prevent an early exit being declared due to an oscillating depletion, since depletions are frequently accompanied by scintillation. In one example, the slope_factor is 0.5 if the IGP slope is downward in time (VDSLOPE<0) and 1.0 if the IGP slope is upward in time (VDSLOPE>=0).

According to one embodiment, determining a depletion exit also includes evaluating the smoothed local slope of delay at the IPP. In one example, depletion exit criteria include the absolute value of the difference between the current smoothed slope and the prior-calculated smoothed slope being less than or equal to a specified threshold value, and the absolute value of the difference between the local smoothed slope and VDSLOPE also being less than or equal to the specified threshold value. These criteria are specified below in Equations (9) and (10), respectively.

$$\text{abs}(\text{GRAD\_SM} - \text{GRAD\_SM\_PREV}) <= T3 \quad (9)$$

$$\text{abs}(\text{GRAD\_SM} - \text{VDSLOPE}) <= T3 \quad (10)$$

The threshold values T1, T2, T3 and fract used in Equations (5)-(7), (9) and (10) may be selected based on an optimization of the detection probability and the false alarm rate of the method. In one example, the threshold values optimized for the Indian equatorial region TEC data are: T1=0.003, T2=0.005, T3=0.003, and fract=0.5.

If the depletion exit criteria of step 730 are met, and/or the depletion duration timer exceeds the time limit specified in step 710, a depletion exit is declared. Accordingly, in one example, the local depletion flag is set to off (step 740) and all parameters (such as the entry delay value, estimated deepest point of the depletion, etc.) are reset (step 750). It is to be appreciated that steps 740 and 750 may be performed in any order or simultaneously and need not be performed in the order illustrated in FIG. 7. If the depletion exit criteria of step 730 are not met, and the depletion duration timer has not reached the time limit, the depletion flag remains unchanged (step 760) and the system waits for the next IPP/epoch (step 260) to repeat the depletion exit test.

The following example demonstrates performance of an embodiment of the above-discussed methods. In this example, historical ionosphere TEC data for the Indian equatorial region was used to provide the IGP and measurement data used in the process. The process of FIGS. 5-7 was implemented as a simulation using the MATLAB™ program available from The Mathworks Inc. (Natick, Mass.).

Figure 8:
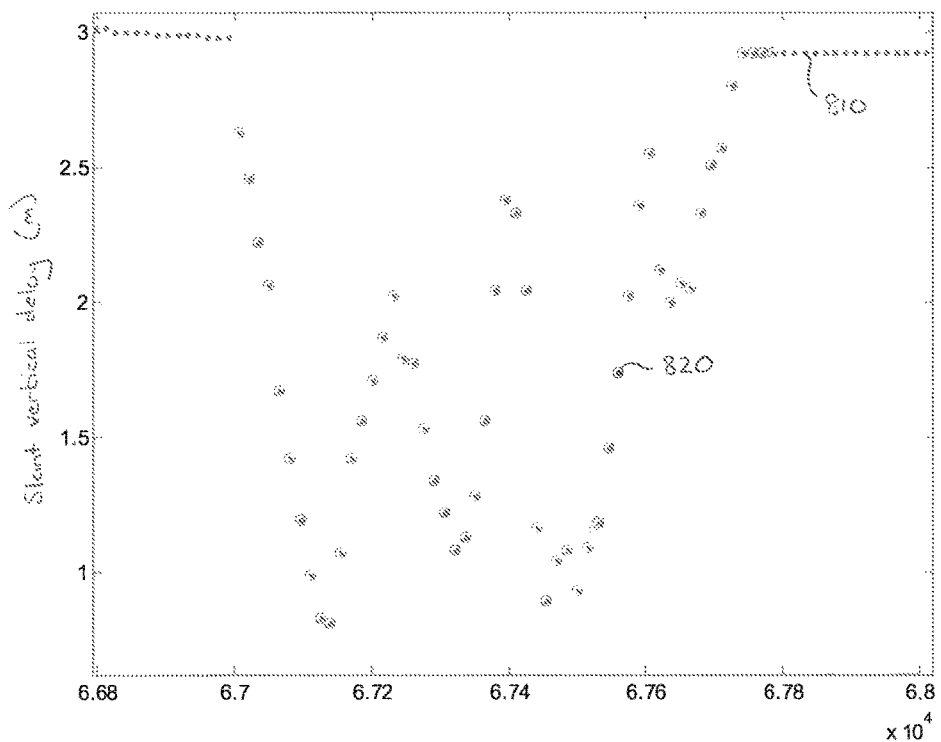
FIG. 8 is a graph illustrating one example of a depletion shape well-detected by an embodiment of a depletion detection method according to aspects of the invention.

Referring to FIG. 8, there is illustrated a plot of an ionosphere depletion that was almost perfectly detected in the simulation. The dots 810 represent actual slant delay values at the simulated IPP, and the open circles 820 represent calculated delay values based on the depletion having been detected. In FIG. 8, slant delay is represented in meters on the vertical axis and the epoch time is represented on the horizontal axis. These simulated results demonstrate that the depletion detection process discussed above performs very well even given a complicated depletion shape, such as that illustrated in FIG. 8.

Figure 9:
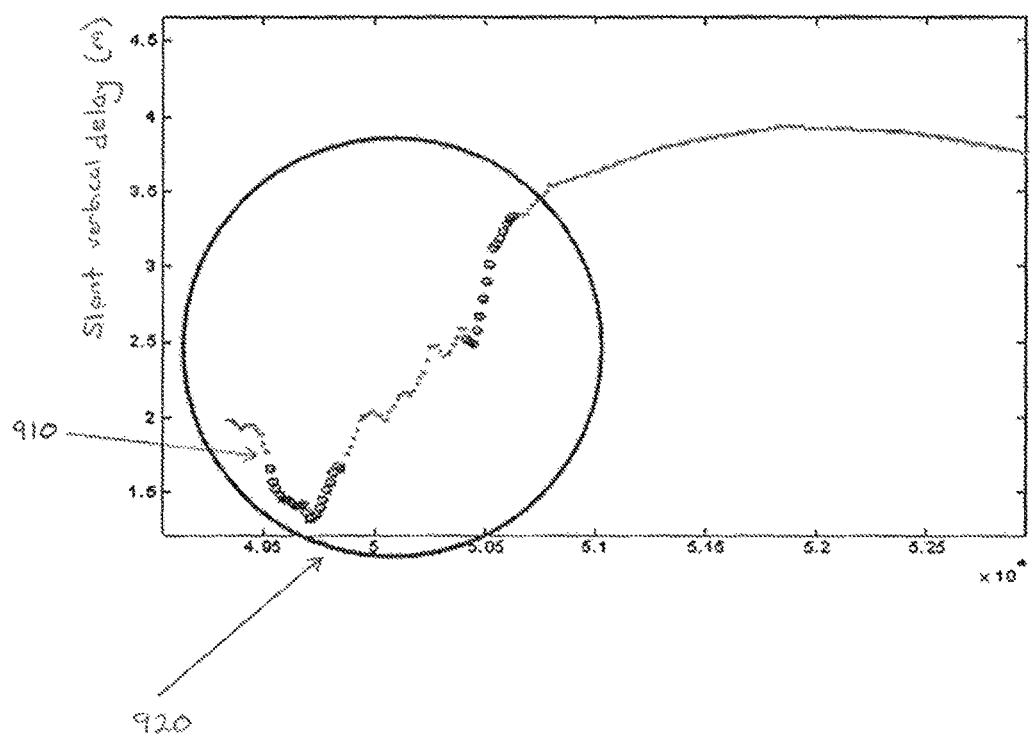
FIG. 9 is a graph illustrating one example of a depletion used to test a simulation of embodiments of a depletion detection method according to aspects of the invention.

Table 1 below illustrates further simulated performance data for an embodiment of the process, demonstrating that the process has a high rate of detection and low rate of false alarms, even on stormy days (during which the ionosphere is generally volatile and experiences more depletions than on nominal days). The lower detection rate achieved by the simulation using historical data from Jun. 3, 2006 was due to a coincidence of a poor grid slope trend resulting from the start of a new IPP and the presence of a particularly long and deep depletion, as illustrated in FIG. 9. In FIG. 9, reference point 910 identifies a 2 meter deep (in terms of slant delay) depletion, and circle 920 captures approximately and 8 meter change in delay. This single event caused a 16% mis-detection, meaning that absent this single event, the detection rate for that simulated day would have been almost 100%. Simulations demonstrate that embodiments of the depletion detection methods discussed above are robust against complicated real depletions.

TABLE 1

|  | Date | % Detected | % False Alarm | Maximum depth missed (m) |
| --- | --- | --- | --- | --- |
| stormy | Nov. 9, 2004 | 96 | 1 | 2 |
|  | Sep. 11, 2005 | 99.5 | 0.165 | 1.46 |
|  | Dec. 14, 2006 | 97 | 0.16 | 1.3 |
| nominal | Dec. 5. 2006 | 100 | 0.02 | <1 |
|  | May 29, 2006 | 100 | 0.015 | <1 |
|  | Jun. 03, 2006 | 83.9 | 0.02 | 2 |

Thus, aspects and embodiments thus provide for a method of ionosphere plasma depletion detection using phase data instead of pseudo ranges to minimize performance degradation due to multipath noise. Temporal differencing of the phase data may be used to remove phase ambiguities, as discussed above. In various examples, the local IPP temporal slope is compared with the large scale (grid-predicted) temporal slope for detection of depletions. The slope comparisons may be performed in either the vertical delay domain or the slant delay domain. Embodiments of the methods of depletion detection may be implemented in either a dual-frequency receiver or a single-frequency receiver, with the phase data input being appropriately calculated/converted based on the type of receiver, as discussed above.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of detecting a plasma depletion in the ionosphere by a global positioning system (GPS) receiver, the method comprising:
   receiving, by an antenna system of the GPS receiver, at least one GPS signal along a line of sight that passes through at least a portion of the ionosphere, the at least one GPS signal including at least two signal components at different frequencies;
   receiving, by the antenna system, broadcast ionosphere grid point (IGP) data;
   extracting, by an initialization module of the GPS receiver, phase data from the at least one GPS signal to provide a phase input;
   determining, by the initialization module, an IGP-predicted temporal slope of delay at an ionosphere pierce point (IPP) along the line of sight based at least in part on the IGP data;
   determining, by the initialization module, a local temporal slope of delay at the IPP based at least in part on the phase data; and
   determining, by a detector module of the GPS receiver, whether the portion of the ionosphere through which line of sight passes is undergoing a plasma depletion based at least in part on the IGP-predicted temporal slope of delay and the local temporal slope of delay.

2. The method of claim 1, wherein determining the local temporal slope of delay at the IPP includes determining the local temporal slope of delay at the IPP based on temporal differencing of the phase input.

3. The method of claim 2, wherein determining whether the portion of the ionosphere is undergoing a depletion includes:
   calculating a second temporal derivative of the local temporal slope of delay at the IPP; and
   declaring a depletion responsive to the second temporal derivative exceeding a threshold value.

4. The method of claim 2, wherein determining whether the portion of the ionosphere is undergoing a depletion includes comparing the IGP-predicted temporal slope of delay and the local temporal slope of delay, and declaring a depletion responsive to a difference between the IGP-predicted temporal slope of delay and the local temporal slope of delay exceeding a threshold value.

5. The method of claim 4, wherein determining the IGP-predicted temporal slope of delay at the IPP includes:
   performing a spatial extrapolation on the broadcast IGP data to provide spatially extrapolated broadcast IGP data;
   performing a spline extrapolation on the spatially extrapolated broadcast IGP data;
   determining a grid rate of change of total electron content; and
   interpolating the grid rate of change of total electron content to provide the grid-predicted temporal slope of delay at the IPP.

6. The method of claim 4, further comprising initiating a depletion duration timer responsive to declaring the depletion.

7. The method of claim 6, further comprising, after declaring the depletion:
   declaring a depletion exit responsive to the depletion duration timer exceeding a time limit.

8. The method of claim 4, further comprising, after declaring the depletion, performing a depletion exit test and declaring a depletion exit responsive to at least one exit criterion of the depletion exit test being met.

9. A method of detecting plasma depletions in the ionosphere at an ionosphere pierce point (IPP) by a wireless receiver, the method comprising:
   receiving, by an antenna system of the wireless receiver, broadcast ionosphere grid point (IGP) data;

receiving, by the antenna system, at least one signal along a line of sight that passes through the IPP, the at least one signal having at least two signal components at different frequencies;

calculating, by an initialization module of the wireless receiver, an IGP-predicted temporal slope of delay at the IPP from the IGP data;

calculating, by the initialization module, a local temporal slope of delay at the IPP based at least in part on phase data extracted from the at least one signal;

comparing, by a detector module of the wireless receiver, the IGP-predicted temporal slope of delay and the local temporal slope of delay; and declaring, by the detector module, a depletion based at least in part on a difference between the IGP-predicted temporal slope of delay and the local temporal slope of delay exceeding a threshold.

10. The method of claim 9, wherein receiving the at least one signal includes receiving a first signal having a first carrier phase and a second signal having a second carrier phase; and wherein calculating the local temporal slope of delay includes determining a difference between the first carrier phase and the second carrier phase to provide a phase input, and calculating the local temporal slope of delay based on temporal differencing of the phase input.

11. The method of claim 9, wherein determining the IGP-predicted temporal slope of delay at the IPP includes:

performing a spatial extrapolation on the broadcast IGP data;

performing a spline extrapolation on the spatially extrapolated broadcast IGP data;

determining a grid rate of change of total electron content; and interpolating the grid rate of change of total electron content to provide the grid-predicted temporal slope of delay at the IPP.

12. The method of claim 9, wherein declaring a depletion further includes calculating a second temporal derivative of the local temporal slope of delay at the IPP; and declaring a depletion responsive to the second temporal derivative exceeding a threshold value.

13. The method of claim 9, further comprising initiating a depletion duration timer responsive to declaring the depletion.

14. The method of claim 13, further comprising, after declaring the depletion, performing a depletion exit test and declaring a depletion exit responsive to at least one exit criterion of the depletion exit test being met.

15. The method of claim 14, wherein performing the depletion exit test includes determining whether the depletion duration timer exceeds a time limit.

16. The method of claim 14, wherein performing the depletion exit test includes:

calculating an updated IGP-predicted temporal slope of delay at the IPP;

calculating an updated local temporal slope of delay at the IPP;

comparing the updated IGP-predicted temporal slope of delay with the updated local temporal slope of delay; and declaring a depletion exit responsive to a difference between the updated IGP-predicted temporal slope of delay and the updated local temporal slope of delay being less than a threshold.

17. The method of claim 9, wherein calculating the IGP-predicted temporal slope of delay includes calculating one of a IGP-predicted temporal slope of vertical delay and a IGP-predicted temporal slope of slant delay; and wherein calculating the local temporal slope of delay includes calculating a corresponding one of a local temporal slope of vertical delay and a local temporal slope of slant delay.

18. A global positioning system (GPS) receiver comprising:

an antenna configured to receive a first GPS signal including at least two signal components at different frequencies;

an initialization module coupled to the antenna and configured to receive the first GPS signal and broadcast ionosphere grid point (IGP) data, and to determine a grid-predicted temporal slope of delay at a designated ionosphere pierce point (IPP) based on the IGP data and a local temporal slope of delay at the designated IPP based on phase data extracted from the first GPS signal; and a detection module configured to detect a plasma depletion in the ionosphere at the designated IPP based on a comparison of the grid-predicted temporal slope of delay and the local temporal slope of delay.

19. The GPS receiver of claim 18, wherein the antenna is further configured to receive a second GPS signal, the first GPS signal having a first carrier phase and the second GPS signal having a second carrier phase;

wherein the initialization module is configured to determine the local temporal slope of delay based on a change over time in a difference between the first carrier phase and the second carrier phase.

20. The GPS receiver of claim 18, wherein the at least two signal components at different frequencies include an L1 signal component and an L2 signal component.

* * * * *